United States Patent
Voss et al.

(10) Patent No.: US 6,332,445 B1
(45) Date of Patent: Dec. 25, 2001

(54) METHOD FOR OPERATING AND VALVE DRIVE FOR A MULTICYLINDER INTERNAL COMBUSTION ENGINE

(75) Inventors: Hartmut Voss, Wimsheim; Joachin Grunberger, Sachsenheim, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/340,728

(22) Filed: Jun. 29, 1999

(30) Foreign Application Priority Data

Aug. 17, 1998 (DE) .............................. 198 37 098

(51) Int. Cl.$^7$ .................................................. F01L 13/00
(52) U.S. Cl. ...................................... 123/198 F; 123/90.16
(58) Field of Search ........................... 123/90.15, 90.16, 123/90.17, 90.12, 198 F, 481

(56) References Cited

U.S. PATENT DOCUMENTS

| | | | |
|---|---|---|---|
| 5,159,905 | 11/1992 | Sugiuchi et al. | 123/90.16 |
| 5,193,496 * | 3/1993 | Kruger | 123/90.16 |
| 5,361,733 * | 11/1994 | Spath et al. | 123/90.16 |
| 5,555,861 * | 9/1996 | Mayr et al. | 123/90.16 |
| 5,558,052 * | 9/1996 | Schwarzenthal et al. | 123/90.16 |
| 5,603,294 * | 2/1997 | Kawai | 123/90.16 |
| 5,651,335 * | 7/1997 | Elendt et al. | 123/90.16 |
| 5,694,894 * | 12/1997 | Allen | 123/90.16 |
| 5,709,180 * | 1/1998 | Spath | 123/90.16 |
| 5,727,527 * | 3/1998 | Mueller et al. | 123/481 |
| 5,782,216 | 7/1998 | Haas et al. | 123/90.16 |
| 5,787,855 * | 8/1998 | Mueller et al. | 123/198 F |
| 5,797,371 * | 8/1998 | Nonaka | 123/481 |
| 5,832,884 * | 11/1998 | Haas et al. | 123/90.16 |
| 5,875,748 * | 3/1999 | Haas et al. | 123/90.16 |
| 5,950,583 * | 9/1999 | Kraxner et al. | 123/90.16 |
| 6,098,592 * | 8/2000 | Hess et al. | 123/350 |

FOREIGN PATENT DOCUMENTS

| | | |
|---|---|---|
| 3306355C2 | 8/1984 | (DE) . |
| 4126204A1 | 2/1993 | (DE) . |
| 4433893A1 | 4/1995 | (DE) . |
| 19604737A1 | 8/1997 | (DE) . |
| 19606054A1 | 8/1997 | (DE) . |
| 19632651A1 | 2/1998 | (DE) . |
| 197 12 668 | 5/1998 | (DE) . |
| 0 583 583 | 2/1994 | (EP) . |
| 0 640 749 | 3/1995 | (EP) . |

\* cited by examiner

*Primary Examiner*—Willis R. Wolfe
*Assistant Examiner*—Hai Huynh
(74) *Attorney, Agent, or Firm*—Crowell & Moring LLP

(57) ABSTRACT

An engine is operated with two groups of cylinders, one of which groups is constantly powered and a second of said groups is selectively operated by cutting it in and out. The second group of cylinders is cut in and out by switching the valve lift of the associated charge-changing valves. The valve lift of the constantly operated cylinder group is also independently variable so that in both operating states of the second cylinder group, consumption-optimized valve lifts can be set for the first cylinder group.

13 Claims, 3 Drawing Sheets

METHOD FOR OPERATING AND VALVE DRIVE FOR A MULTICYLINDER INTERNAL COMBUSTION ENGINE

BACKGROUND AND SUMMARY OF THE INVENTION

This application claims the priority of German application 198 37 098.9, filed Aug. 17, 1998, the disclosure of which is expressly incorporated by reference herein.

The invention relates to a method for operating and a valve drive for a multicylinder internal combustion engine of the type having first and second groups of cylinders which are selectively operable.

A method according to the species for operating a multicylinder internal combustion engine is known from German Patent Document No. DE 196 0 4 737 A1. This internal combustion engine has two groups of cylinders, one of which is constantly operated and the second is operated by cutting it in and out. To operate this engine, the second cylinder group is cut out in a lower full load range and the first cylinder group is operated between zero and full load. In an upper total range, the second cylinder group is cut in and operated between zero and full load. The first cylinder group is constantly operated at full load in this upper load range. A method of this kind for operating a multicylinder internal combustion engine has the disadvantage that completely separate intake systems and intake system controls are required for the two groups of cylinders. Therefore, two separate control and regulating units and two mass airflow meters and airflow sensors connected with them are required as well.

A valve drive of an internal combustion engine is also known from German Patent Document No. DE 196 06 054 A1 that is operated with a device for changing the valve phases and with switchable lift transfer elements. As a result of the switchable lift transfer elements, the valve lift of the associated charge-changing valves can be operated with a long or short lift regardless of the valve opening phase that has been set. With a valve drive of this kind, the engine can be operated as a function of rpm (engine speed revolutions per minute) and load in various operating modes with optimum fuel consumption and emission values in each case.

On the other hand, a goal of the invention is to improve the method according to the species for operating a multicylinder internal combustion engine and the valve drive of a multicylinder engine so that an additional reduction of fuel consumption, especially at idle and under low loads, can be achieved at low structural and control-engineering cost.

This goal is achieved according to preferred embodiments of the invention by providing that at least one of the selectively operable groups of cylinders has a valve lift control operable as a function of load and/or rpm. In arrangements of the engine where the first cylinder group in an engine with a first constantly operated group of cylinders and a second group of cylinders that can be cut in and out independently of the first group are operated with different valve lift values, in both a load range with the second cylinder group cut out and in a load range with the second cylinder group cut in, in the lower part of the each of these load ranges a considerable reduction of fuel consumption is achieved by operation with a shorter valve lift. Operation of this kind has the advantage that because on the shorter valve lift in the lower load range in each case there is a significant reduction of friction and a considerable dethrottling of the intake process. Especially in the idle range, with the second group of cylinders cut out, a higher degree of smooth running of the engine can simultaneously be guaranteed. A method of this kind can be employed at only relatively low cost in the entire intake system since in particular it is not necessary to divide the intake system between the two differently operated groups of cylinders.

If the group of cylinders that can be cut in and out in a valve drive according to the species is designed so that the valve lift in each case is different and in the cut-out state of the cylinders the valve lift of the intake valves is zero or minimal, by switching the valve lift of the other cylinder group between a medium lift and a long lift, a considerable saving of fuel can be achieved as well. Especially in the lower full load range, by cutting out the second group of cylinders and operating the first group of cylinders with a short valve lift, considerable improvements in friction are achieved.

If the engine is operated with the cylinder group either cut out or constantly cut in, in the lower range of the associated load ranges with a short valve lift in the constantly operated cylinder group, considerable fuel consumption advantages can be realized especially by reducing friction. By reducing the valve lift in the lower load range in each case, an improved dethrottling is also possible on the intake side of the engine.

If the engine, with the second cylinder group either cut out and/or constantly cut in, is operated with a long valve lift in the first cylinder group, a greater degree of filling of the cylinders can be achieved in the upper levels of the associated load ranges in each case, so that significant advantages regarding power and torque are achieved with the second cylinder group either cut in or cut out.

Particularly in the respective partial load range of the constantly cut-in cylinder group, an improved filling of the cylinders can be achieved if each cylinder in this group of cylinders is operated with two intake valves that have different valve lifts. With these different valve lifts per cylinder, a deliberate swirl can be produced. As a result of this deliberate swirl of the incoming fuel-air mixture or of the air drawn in, especially in the partial load range, the filling behavior and combustion process can be improved.

A valve drive of this kind is especially compact if the lift transfer element is designed as a tappet with two concentric lift elements. A valve drive of this kind can replace a conventional valve drive with tappets at a relatively small additional cost.

Other objects, advantages and novel features of the present invention will become apparent from the following detailed description of the invention when considered in conjunction with the accompanying drawings.

DETAILED DESCRIPTION OF THE DRAWINGS

Figure 1:
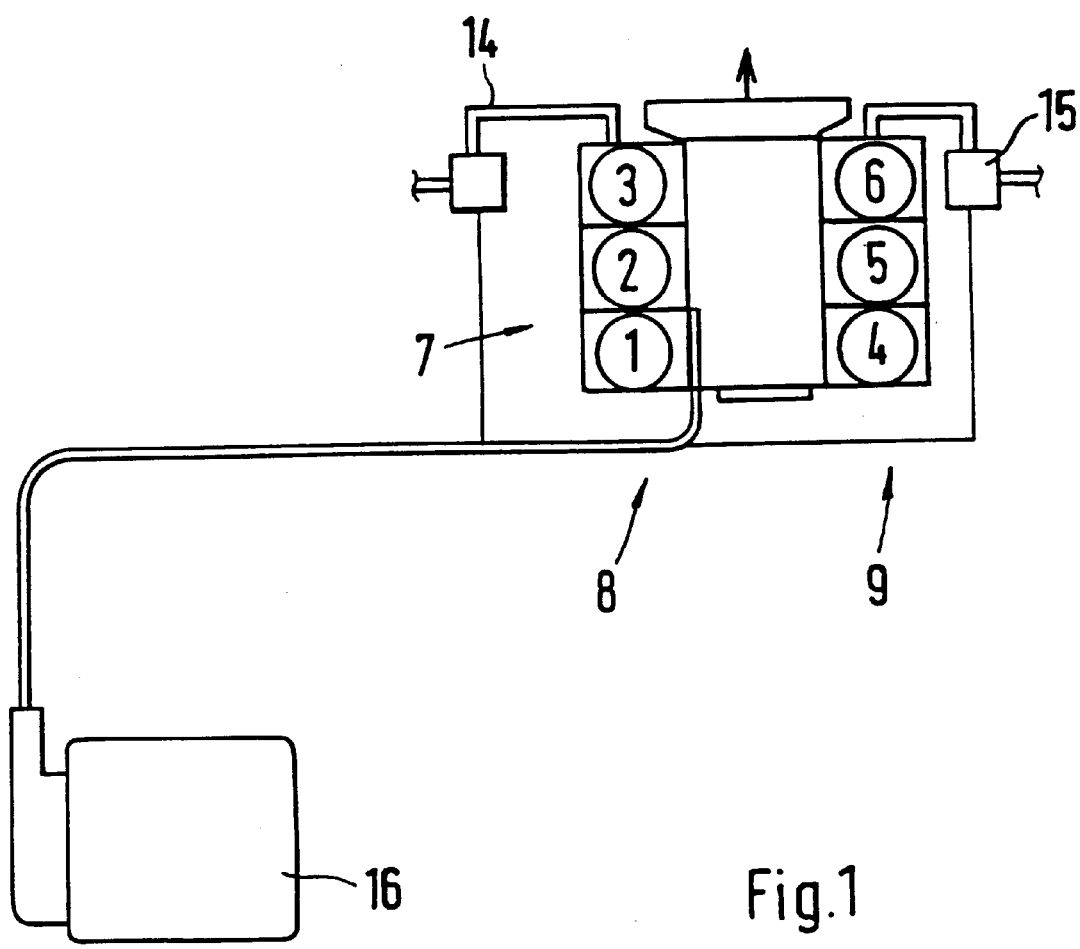
FIG. 1 is a schematic diagram of an engine constructed according to preferred embodiments of the invention.
Figure 2:
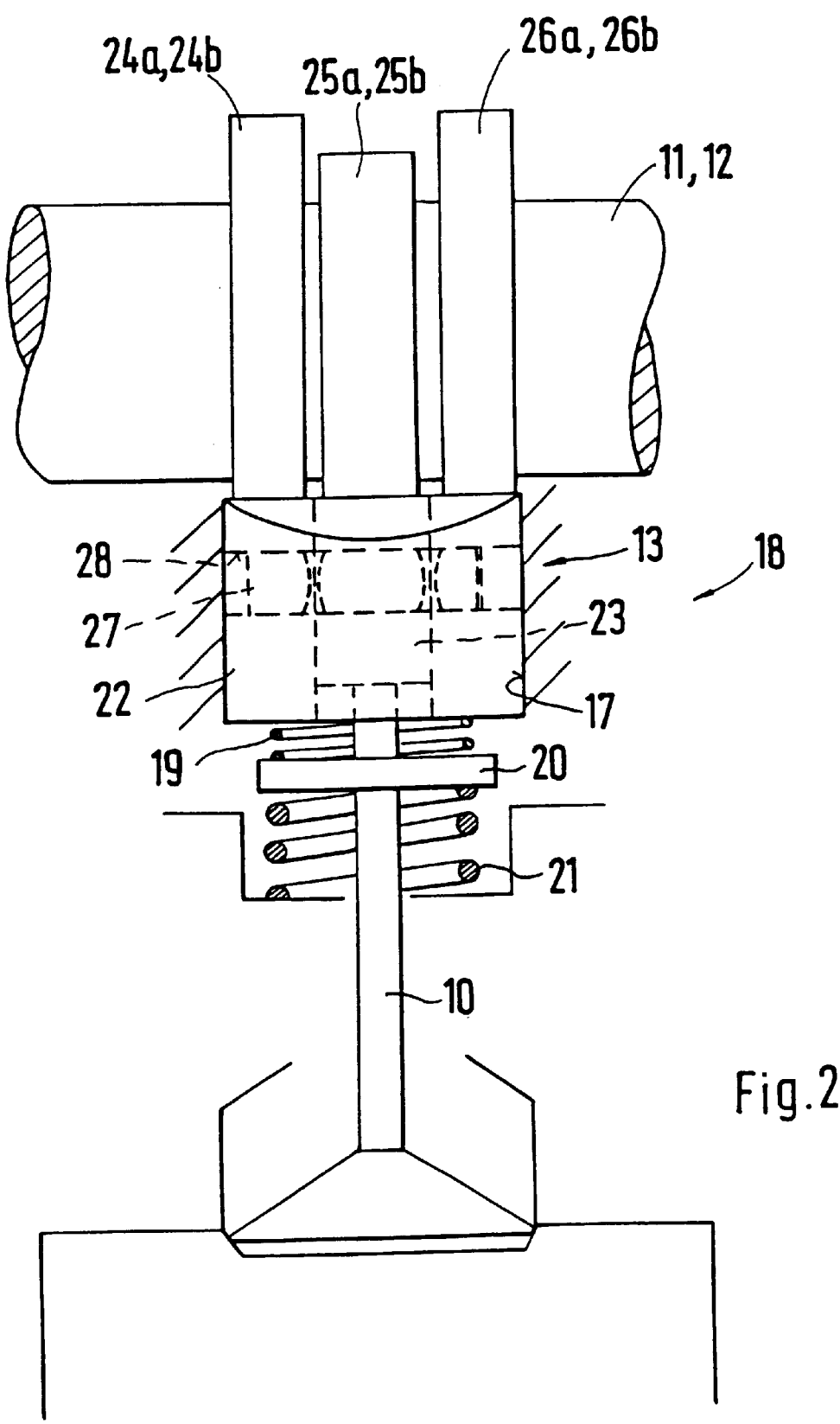
FIG. 2 is a schematic diagram of the valve drive for the engine of FIG. 1.

In the engine 7 shown schematically in FIG. 1, without limitation to this embodiment, a 6-cylinder opposed-piston engine is involved, with cylinders 1 to 6. Cylinders 1 to 3 form a first cylinder bank or cylinder group 8 and cylinders 4 to 6 form a second cylinder bank or cylinder group 9. The charge-changing valves 10 shown in greater detail in FIG. 2 are actuated by a camshaft 11,12. The charge-changing valves 10 are operated as a function of rpm and/or load, with different valve lifts. For this purpose, the respective lift transfer element 13 is moved into its corresponding switch position under the control of hydraulic valve 14 or 15. A central control device 16 thus controls the engine in general as well as the hydraulic valves 14 and 15 in particular.

The valve drive shown schematically in FIG. 2 shows an example of charge-changing valve 10 serving as an intake valve, actuated by a camshaft 11,12 through a lift transfer element 13 designed as a cup-shaped tappet. This valve drive represents the intake side of the cylinder in the embodiment described here. The structural design of the valve drive is essentially the same for both cylinder groups 8 and 9 and differs only by the lift height that depends on the operating point, as described in greater detail below. The intake valves 10 of the first cylinder 8 are operated by a camshaft 11 and the intake valves of the second cylinder group 9 are operated by a second camshaft 12. Each of the tappets 13 is mounted in a bore 17 of a cylinder head 18 and abuts a valve head 20 permanently mounted on charge-changing valve 10 through a compression spring 19. A valve spring 21 abuts the underside of valve head 20, said spring abutting the cylinder head opposite and moving the charge-changing valve 10 into its closed position.

The lift transfer element 13 designed as a cup-shaped tappet has two concentric cup elements 22, 23 that cooperate with different partial cams 24a, 24b to 26a, 26b of camshaft 11 or 12. The two outer partial cams 24a, 24b and 26a, 26b are designed to be the same, in other words they have the same lift height and phase position. These two partial cams cooperate with the outer 22 of the two cup elements. The middle partial cams 25a, 25b have a shorter lift height and cooperate with the inner cup element 23. The two cup elements 22 and 23 can be coupled or decoupled by coupling elements 27 that are mounted displaceably in a bore 28 that extends crosswise. For this purpose, coupling elements 27 are pressurized through hydraulic valve 14 or 15. Such a lift transfer element is described for example in German Patent Document No. DE 195 46 437 A1. In the switch position of coupling element 27 shown in FIG. 2, the two cup elements 22 and 23 are not coupled to one another so that the lifting movement of the middle partial cam 25a, 25b is transmitted by the inner cup element 23 to the charge-changing valve 10.

In this uncoupled switch position, the outer cup element 22 is moved by partial cams 24a, 24b and 26a, 26b independently of inner cup element 23, without its lifting movement being transferred to the charge-changing valve. In the second switch position of coupling element 27, not shown, the two cup elements 22 and 23 are coupled together. In this switch position, the charge-changing valve 10 follows the lifting pattern of the two outer partial cams 24a, 24b, and 26a, 26b and is actuated with a correspondingly greater valve lift.

The partial cams 24a, 24b and 26a, 26b are designed for the two cylinder groups 8 and 9 so that they produce a greater valve lift. It is readily possible for the lift curves of the outer partial cams to be the same for both cylinder groups. The middle partial cams 25a, 25b are designed differently for the two cylinder groups 8 and 9.

The middle partial cams 25a for the first constantly operated cylinder group 8 are so designed that they have a shorter lift than the corresponding outer partial cams 24a and 26a. In addition, these central partial cams also have a different phase position adapted to the operating range in each case.

In the case of the second cylinder group 9 that can be cut in and out, the partial cams 25b are designed so that their lift height that is transferred to charge-changing valve 10 is zero, so that the charge-changing valve 10 or the intake valve is not opened in the corresponding switch position of the lift transfer element 13. However it is also contemplated to design the lift height of the middle partial cam 25b for the second cylinder group 9 so that a very short valve lift is transferred to charge-changing valve 10. With such a design, a situation can be avoided in which fuel collects on the side of the intake valve facing away from the combustion chamber, which fuel would enter the combustion chamber after the cylinder was cut in again and lead to brief unregulated combustion therein.

An internal combustion engine of this kind, depending on the type of control, can be operated in four different operating states of the entire valve drive:

Operating state A: Second cylinder group 9 cut out (valve lift zero, effective partial cam 25b) and first valve group 8 with short valve lift (effective partial cam 25a);

Operating state B: second cylinder group 9 cut out (valve lift zero, effective partial cam 25b) and first cylinder group 8 with long valve lift (effective partial cams 25a, 26a;

Operating state C: second cylinder group 9 cut in (long valve lift, effective partial cams 24b, 26b) and first cylinder group 8 with short valve lift (effective partial cam 25a); and Operating state D: second cylinder group 9 cut in (long valve lift, effective partial cams 24b, 26b) and second cylinder group 9 with long valve lift (effective partial cams 24a, 26a).

Figure 3:
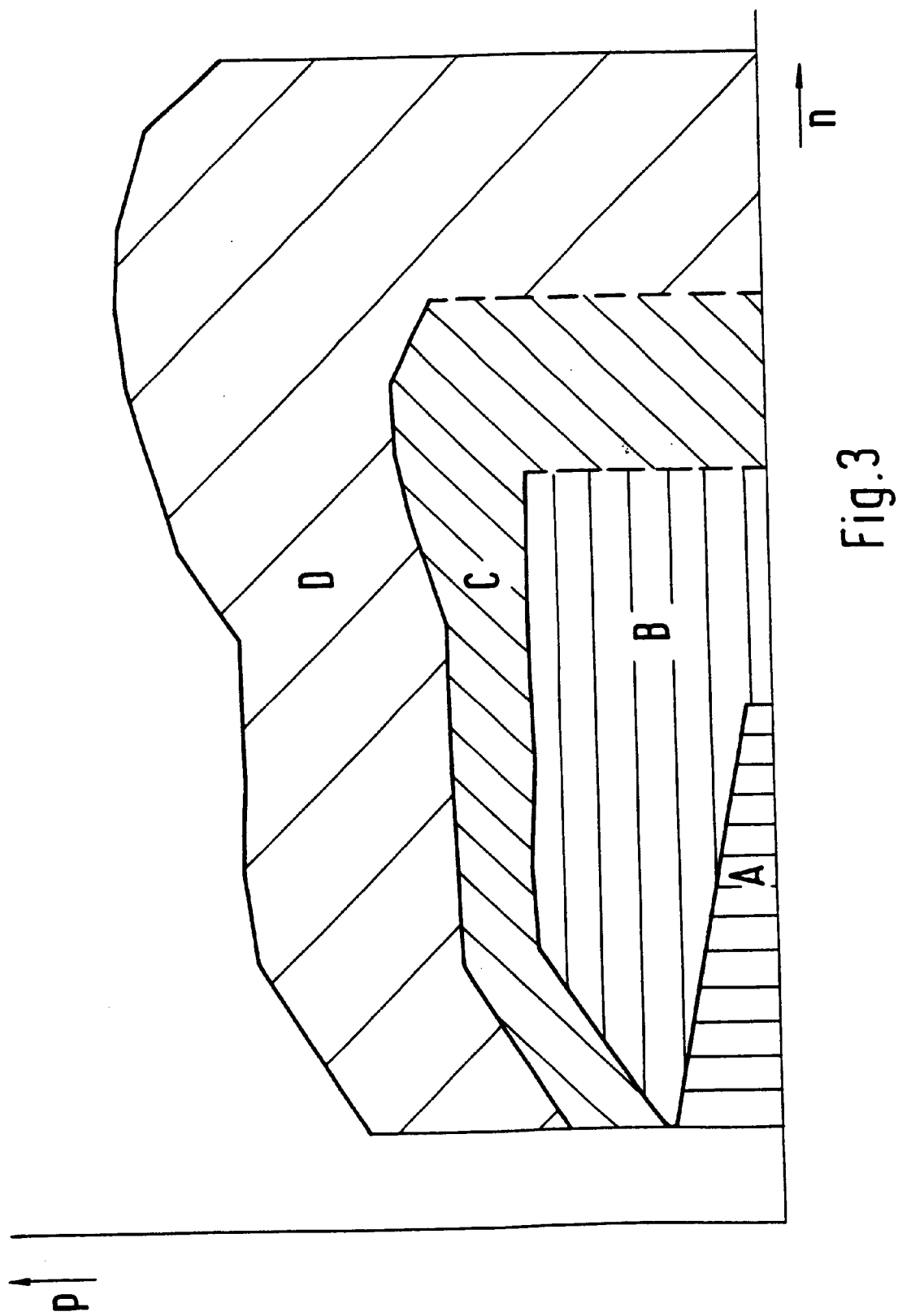
FIG. 3 is a graph of the valve drive in which the different operating modes of the valve drive are plotted as a function of rpm and load as well as the effective mean pressure.

A type of operation of an engine that is especially favorable from the fuel consumption standpoint and is nevertheless efficient is obtained when the engine, as a function of rpm and load, is operated at one of the four operating points A to D on the basis of the characteristic map shown in FIG. 3. It has been found that a great potential for reducing fuel consumption during operation of such an internal combustion engine is obtained by optimizing the partial load consumption during operation of such an internal combustion engine by optimizing the partial load consumption and consumption at idle by optimized combustion, reduction of charge-changing losses, and reduction of friction. Clear consumption advantages in the partial load range are achieved with reduced valve lift by reduction of the valve opening forces and hence reduced friction. Since up to 50% of mechanical losses are caused by drive losses in the valve drive at low engine rpm, fuel consumption can be clearly reduced, especially in the partial load and idle range.

During operation at idle and in the vicinity of idle operation, with low rpm and load, the engine is operated with the second cylinder group cut out and limited lift values in the first cylinder group (operating state A). In the middle area of the characteristic map which in practice is used most frequently (partial load range), with slight to medium load requirements, the engine can be operated in particular to reduce consumption in the lower portion of this range with two different partial load modes. At low load and low rpm, the engine is operated with the second cylinder group cut out and a short valve lift in the first cylinder group. In a higher partial low range, with higher load requirements and/or rpm values, the engine is operated with the second cylinder group cut in and a limited valve lift in the first cylinder group (operating state C). In the full load range of the engine, both cylinder groups are operated with a long valve lift (operating state D).

An operating method of this kind is suitable for a number of engine designs that have at least two cylinders and which all have at least one cylinder at a time constantly operating and a second that can be operated by being cut in or out.

This operating method is also suitable for valve drives that cooperate with lift transfer elements that operate differently than those presented here as examples. It is readily possible, instead of the switchable tappets, to use suitably designed cam-follower or rocker-arm valve drives.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of operating a multicylinder internal combustion engine with a first constantly operated cylinder group and a second cylinder group that can be cut in and out independently of the first cylinder group, said method comprising:

cutting out the second cylinder group in an engine lower load range, cutting in the second cylinder group in an engine upper load range, cutting out the second cylinder group and operating the first cylinder group with a short valve lift during engine idle operation, cutting out the second cylinder group and operating the first cylinder group with a long valve lift during an engine lower partial load range, and cutting out the second cylinder group and operating the first cylinder group with a short valve lift during an engine upper partial load range.

2. Method of operating a multicylinder internal combustion engine according to claim 1, comprising:

cutting in the second cylinder group and operating the first cylinder group with a long valve lift during an engine full load range.

3. Control assembly for operating a multicylinder internal combustion engine with a first constantly operated cylinder group and a second cylinder group that can be cut in and out independently of the first cylinder group, said control assembly comprising:

means for cutting out the second cylinder group in an engine lower load range, means for cutting in the second cylinder group in an engine upper load range, means for cutting out the second cylinder group and operating the first cylinder group with a short valve lift during engine idle operation, means for cutting out the second cylinder group and operating the first cylinder group with a long valve lift during an engine lower partial load range, and means for cutting out the second cylinder group and operating the first cylinder group with a short valve lift during an engine upper partial load range.

4. Control assembly according to claim 3, comprising:

means for cutting in the second cylinder group and operating the first cylinder group with a long valve lift during an engine full load range.

5. Control assembly according to claim 3, wherein means for operating the first cylinder group with different valve lift includes lift transfer elements between cams of an engine camshaft and respective intake valves, wherein at least two intake valves are provided per cylinder, and wherein each intake valve cooperates with a cam with at least two different lift curves.

6. Control assembly according to claim 5, wherein the cams have a first lift curve for a long valve lift and a second lift curve for a short valve lift, and wherein the lift curves for a short valve lift of the at least two cams associated with a cylinder are different.

7. Control assembly according to claim 5, wherein the lift transfer elements are designed at cup tappets with two concentric lifting elements.

8. An internal combustion engine comprising:

a first piston and cylinder group which in use is operating during all engine operation conditions, a second piston and cylinder group which in use is selectively operating only during certain engine operation conditions, and a controlling assembly for controlling operation of the engine, including:

means for cutting out the second cylinder group in an engine lower load range, means for cutting in the second cylinder group in an engine upper load range, means for cutting out the second cylinder group and operating the first cylinder group with a short valve lift during engine idle operation, means for cutting out the second cylinder group and operating the first cylinder group with a long valve lift during an engine lower partial load range, and means for cutting out the second cylinder group and operating the first cylinder group with a short valve lift during an engine upper partial load range.

9. An internal combustion engine according to claim 8, wherein said valve lift control assembly includes selectivity operable cams with different valve lift characteristics.

10. An internal combustion engine according to claim 8, comprising a valve lift control assembly for said second group which is operable to change valve lift levels for intake valves associated with the second group during changes in engine operating conditions.

11. An internal combustion engine according to claim 8, wherein means for operating the first cylinder group with different valve lift includes lift transfer elements between cams of an engine camshaft and respective intake valves, wherein at least two intake valves are provided per cylinder, and wherein each intake valve cooperates with a cam with at least two different lift curves.

12. An internal engine according to claim 11, wherein the cams have a first lift curve for a long valve lift and a second lift curve for a short valve lift, and wherein the lift curves for a short valve lift of the at least two cams associated with a cylinder are different.

13. An internal engine according to claim 11, wherein the lift transfer elements are designed at cup tappets with two concentric lifting elements.

* * * * *